MAGNETIC MEMORY STORAGE CIRCUIT AND APPARATUS

Filed April 29, 1954 2 Sheets-Sheet 1

INVENTOR
LYLE G. THOMPSON
BY
Laurence R. Brown
ATTORNEY

RC TIME CONSTANT
$20 \times 10^3 \times 20 \times 10^{-12} = 40$ SEC.

| TC | E | RISE TIME |
|---|---|---|
| 0 | -120 | 0 |
| 1 | - 40 | .4 |
| 2 | - 13 | .8 |
| 3 | - 4 | 1.2 |
| 4 | - 1.3 | 1.6 |
| 5 | - .4 | 2.0 |

INVENTOR
LYLE G. THOMPSON
BY
Laurence R. Brown
ATTORNEY

United States Patent Office 2,822,532

Patented Feb. 4, 1958

2,822,532

MAGNETIC MEMORY STORAGE CIRCUITS AND APPARATUS

Lyle G. Thompson, Broomall, Pa., assignor to Burroughs Corporation, Detroit, Mich., a corporation of Michigan Application April 29, 1954, Serial No. 426,350

14 Claims. (Cl. 340—174)

This invention relates to magnetic memory circuits and apparatus using static magnetic binary storage elements. It relates more particularly to magnetic shift registers, and to driving circuits for such registers.

Electronic computing systems may employ magnetic shift registers advantageously for the storage and manipulation of binary information. One type of magnetic shift register, as used in such systems, is described in an article entitled "Static magnetic storage and delay line," by An Wang and Way Dong Woo, published in the Journal of Applied Physics, January 1950.

A static magnetic core of this type used in a magnetic shift register circuit has a rectangular hysteresis characteristic and therefore is capable of being magnetized to saturation in either of two directions. After such magnetic saturation, a remanent flux remains in the core of the polarity to which the core was saturated. Two remanent states, therefore, are provided which are used to store corresponding binary information. The information stored in a core may be sensed by applying a saturating magnetic field of one predetermined polarity. If the core is in the remanence polarity of the saturating field, only a small noise voltage will be induced in the windings about the core. However, if the core is in the remanence state opposite to the saturating field, the storage state will switch and cause a high output voltage to be induced in the windings. Thus, the state in which the direction of remanence is opposite to that which would result from the application of a sensing or shift pulse to a shift winding on the core may be called an active state, and conversely the state in which the direction of remanence is the same as that which would result from the application of a sensing pulse as an inactive state. When a sensing flux is applied to a core in the active state, the inactive state is thereby caused to appear. However, when the sensing flux is applied to a core already in the inactive state, no change is caused in the storage state. The smaller output voltage induced during the latter sensing operation may be termed noise, since it gives an indication similar to the larger voltage caused during a change of the storage state, and is therefore undesirable.

In digital notation, a core in the active state may be referred to as storing a binary digit "one," and a core in the inactive state may be referred to as storing the digit "zero." A single piece of stored binary information of either polarity may be termed as a "baud." Each core can store only one binary digit at any one time, and by action of the shift pulse, the core is reset in the "zero" condition, which enables it to receive a baud of binary input information.

Prior art magnetic shift registers have used three windings on each magnetic core. One of these windings is used to receive information transmitted from preceding circuits, a second winding is used to transmit the information to following circuits such as another magnetic storage element, and the third winding is used as the shift or sensing winding through which current pulses are passed to shift information out of the transformer core and return it to the inactive state.

An effort has been made in prior art circuits to supply rectangular or square wave shift current pulses to such shift windings. However, I have discovered that improved operation results, with less noise being induced when a core is sensed in its inactive state, when the shift current pulses are made to have a slow rise time at the leading edge resulting in a rounded shift current waveform.

In computer circuits it is desirable to afford operation of magnetic memory devices and shift registers in response to pulses of different lengths. This eliminates the necessity for providing shift pulses accurately timed as to duration. Moreover, it might be desirable to provide push button operation for effecting the shift of information along a magnetic shift register in addition to the usual shifting operation in response to a source of input pulses of fixed length. This becomes difficult since magnetic units are critical in operation, and require shifting pulses of substantially the same length. Therefore, it is necessary to provide driving means for magnetic units which will not be adversely effected by a change in the length of the input pulses.

Therefore, a general object of the invention is to improve the operation of magnetic memory devices and magnetic shift registers.

Another object of the invention is to increase the signal to noise ratio in magnetic memory devices.

Another object of the invention is to provide magnetic shift registers and magnetic memory devices which may be sensed with input pulses of variable length.

These objects are accomplished in accordance with the present invention by affording improved driving circuits which operate in response to input pulses of various length and which have substantially square or rectangular wave configurations. A coupling circuit is provided for modifying the input pulses to provide resulting single pulses of substantially fixed length suitable for driving the magnetic memory devices. In order to provide better signal to noise ratios, the resulting pulses are provided with a rounded leading edge by designing the driver circuit so that it provides a slow rise time in response to the rectangular input waveforms.

A more detailed discussion of the nature and construction of the present invention may be considered in connection with the accompanying drawing, wherein.

Figure 1:
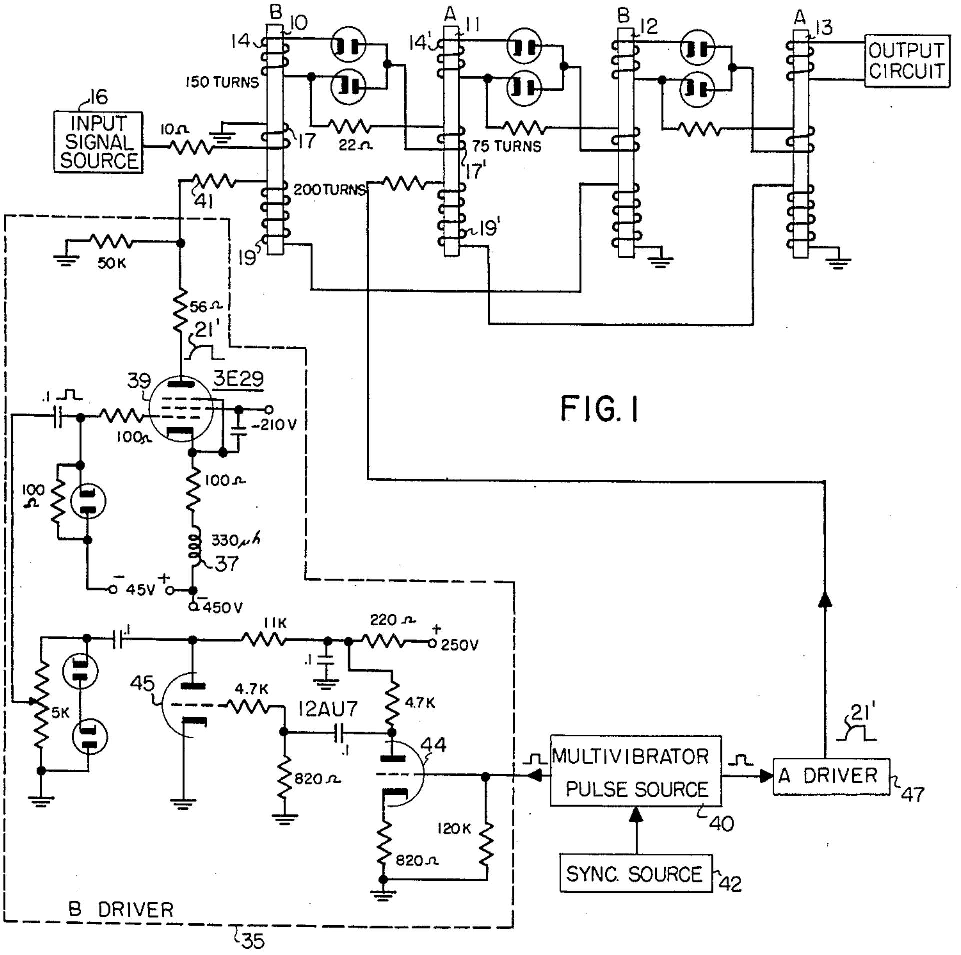
Fig. 1 is a circuit diagram of a magnetic shift register circuit and accompanying rounded waveform driving circuit constructed in accordance with the invention.

Throughout the drawings, like reference characters are used to designate similar features in order to facilitate comparison of the several views. In order to more particularly point out the features contributed by the present invention, those circuits which of themselves are well known in the art, and whose details do not form a part of the present invention, are shown only in block diagram form.

In Fig. 1 a schematic circuit diagram of a magnetic shift register is shown containing the cascade coupled magnetic storage units 10 to 13. These storage units include ferromagnetic cores having a substantially rectangular hysteresis characteristic, of the type hereinbefore described. The coupling circuits between each of the elements includes a pair of diodes and a resistor, which are used for the conventional purpose of causing transfer of stored information from one unit to another only in response to pulses which are generated when shift current pulses cause the remanence state of the elements to switch from one state to another.

Input signals, such as in the form of current pulses, may be inserted into the first magnetic storage unit 10 of the shift register from an input signal source 16 coupled to the input winding 17. Assume that a baud of input information at winding 17 changes the state of the magnetic element 10 from its "zero" inactive condition to its "one" active condition. This action will cause a high voltage to be induced in all of the windings about the core including output winding 14. Because of the series rectifier in the transfer loop associated with the output windings, however, there is no transfer of information to the input winding 17' of the second storage unit 11. But, when an advance current pulse is applied to shift winding 19, thereby returning the storage condition of the core to its "zero" state, a large potential is again induced in the outout or transformer winding 14 of such polarity that the information is transferred to element 11 thereby putting it in the "one" storage state. Likewise, the information may be transferred from element 11 to element 12 by a subsequent advance pulse at the shift winding 19' of element 11. The voltage induced in the input winding 17' at the time of this transfer is prevented from affecting the storage state of element 10 by means of the shunt diode in the coupling loop. In this shift register operation, there is in reality, a pair of alternate storage sub-registers respectively comprising the sets of magnetic elements A and B. Two sub-registers are necessary to afford temporary storage in one of the sub-registers until information is removed from the other sub-register.

Assume now that the input signal source 16 provides a baud which represents the binary "zero" state. With this information at input winding 17, the element 10 is merely driven into saturation from its remanence state, without switching the core to its opposite remanence condition. This will cause only a small voltage to be induced in the transformer windings. This small voltage represents noise since it is in the proper polarity for transfer to the next storage element 11 by the series diode and will tend to switch that element. Accordingly, it is extremely desirable to reduce the amplitude of the noise signals caused when the core is sensed in its inactive state. It is noted that if the hysteresis characteristic of the core material is absolutely rectangular, theoretically there will be no noise induced in the inactive state. However, the cores only approximate this condition, and if the transfer of noise pulses is reduced, the selection of core materials will be made less critical.

Figure 2:
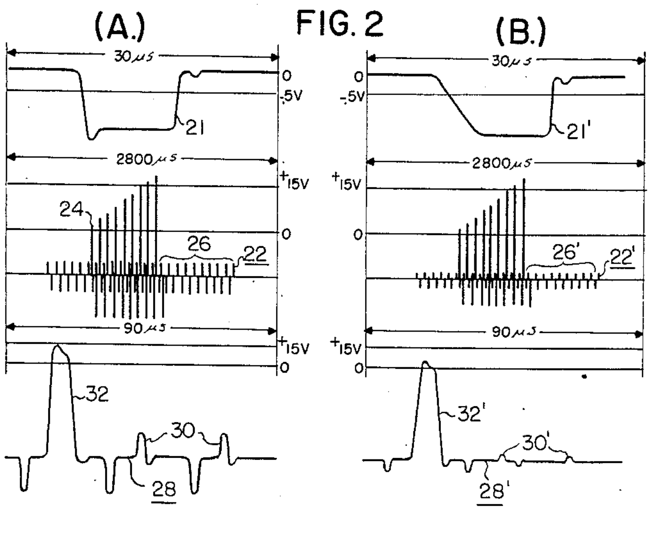
Fig. 2 is a chart showing waveforms for illustrating operational advantages of the rounded driving waveform provided by the invention.

Consider the waveforms of Fig. 2 to understand the manner in which the present invention reduces noise developed by sensing elements in the inactive state. The waveforms of Fig. 2A indicate conventional rectangular drive waveform operation of magnetic shift registers. The drive waveform 21 is used to shift information out of a particular storage element, and thereby return it to its inactive state. Operation of a shift register having sixteen cores for the storage of eight bauds is illustrated by the output waveforms 22. The waveforms are taken from the last register element when the register is intermittently filled and emptied at a constant rate with "ones." The smallest amplitude pulse 24 is the "one" output derived when the rest of the line is full. The pulses within the bracket 26 are the noise pulses induced as the core is sensed to saturation and back to its incative "zero" state. The individual pulses may be seen in the expanded waveform 28 wherein the noise pulses 30 may be compared in amplitude with the signal pulse 32. This operation typifies the usual prior art operation of magnetic shift registers.

However, I have discovered that improved operation may be afforded with the drive waveform 21' of Fig. 2B having a rounded leading edge. It may be seen from the resulting output waveforms 22', taken in the same manner as the waveforms 22, that the noise is greatly decreased during the time that "zero" information is being read out of the register. This is shown in the expanded waveform 28' wherein the ratio of signal pulses 32' to noise pulses 30' is greatly increased over that of the corresponding waveforms when rectangular driving pulses are used. Although the signal pulses are slightly decreased in amplitude, this is not an important consideration in view of the very much better signal to noise ratio obtainable.

By returning to Fig. 1, it may be seen that the B driver circuit within the dotted enclosure 35 is modified to produce the rounded waveform operation by provision of an inductor 37 in the cathode circuit of the driving amplifier tube 39. A rectangular driving input pulse to the B driver circuit is obtained from a multivibrator pulse source 40. The multivibrator is synchronized from a suitable synchronizing source 42, if desired. The rectangular wave input pulse is amplified by the two amplifier tubes 44 and 45 to arrive at the input electrode of the driver tube 39 in substantially the same rectangular shape. The output waveform 21' of Fig. 2B, which results from action of inductor 37, is developed by the shift current across a 10 ohm resistor 41 in the lead to the shift winding 19.

Since alternating A and B driving pulses are required for operation of the shift register, an A driver unit 47 is provided for the A cores similar to the B driver circuit 35 for the B cores. The multivibator pulse source 40 is also connected to the A driver circuit 47. Thus, the entire shift register is made to operate in the improved manner illustrated by the waveforms of Fig. 2B in accordance with the present invention.

Figure 3:
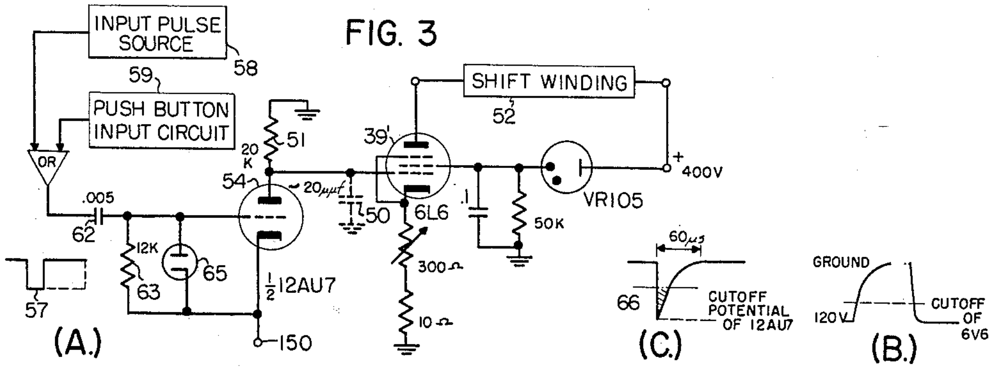
Fig. 3 is a diagram of a further circuit embodiment of the invention, together with illustrative waveforms.

In Fig. 3 is shown a further magnetic element driver circuit constructed in accordance with the invention. In this circuit the rounding of the waveform is effected in the input circuit of a 6L6 driver tube 39', primarily by means of the stray input capacitor 50 and the input resistor 51. The shift winding load circuit 52 of the driver tube may also be used to aid the production of the rounded waveform. The rounding of the waveform is accomplished in substantially the same manner as that described on page 21 in Fig. 2.4*a* of the publication of the Radiation Laboratory of the Massachusetts Institute of Technology entitled "Waveforms" and published in 1949 by the McGraw-Hill Book Company. In operation, the amplifier tube 54 has its cathode maintained at —150 volts, and thereby normally conducts to afford a negative potential across resistor 51 large enough to maintain the grid of the driver tube 39' well below cutoff at about —120 volts. Upon receipt of a rectangular waveform at the input circuit of the amplifier tube 54, the tube 54 is driven beyond cutoff to provide an input signal wave form for the driver tube 39' of the shape shown by the waveform of Fig. 3B. The table provided in connection with Fig. 3B indicates the approximate operation of the R–C time constant circuit comprising capacitor 50 and resistor 51 to provide the rounded waveform. It is seen that because the driver tube 39' is biased below cutoff, it takes several time constant periods for the input waveform to rise to above cutoff level and eventually arrive at near ground level to thereby afford full conduction of the driver tube. This results in the slow rise time shown in the waveform, which with the illustrative parameters of Fig. 3, requires approximately two microseconds to reach full amplitude.

The input waveform 57 in Fig. 3A, may be derived from either the input pulse source 58 or the push button input circuit 59, and therefore may be of variable duration. Because of this, the input coupling circuit to the amplifier tube 54 has an R–C time constant afforded by capacitor 62 and resistor 63 of about 60 microseconds. This assures that the input pulse will charge capacitor 62 in a period not greater than about 60 microseconds, even though the push button input circuit may be held down for several seconds. This results since capacitor 62, upon becoming fully charged, sees a direct current which it will not pass. This remains until the push button is released, at which time no input voltage will be developed because of the clamping diode 65. Accordingly, a single resulting pulse of substantially fixed duration is provided in response to input pulses of lengths greater than the time constant of the input circuit. The waveform of Fig. 3C illustrates the type of resulting input waveform which will be afforded to amplifier tube 54. Although the leading edge 66 of the resulting waveform is very sharp, the input circuit to the driver tube 39 will function in the manner described to provide the rounded waveform of Fig. 3B.

Figure 4:
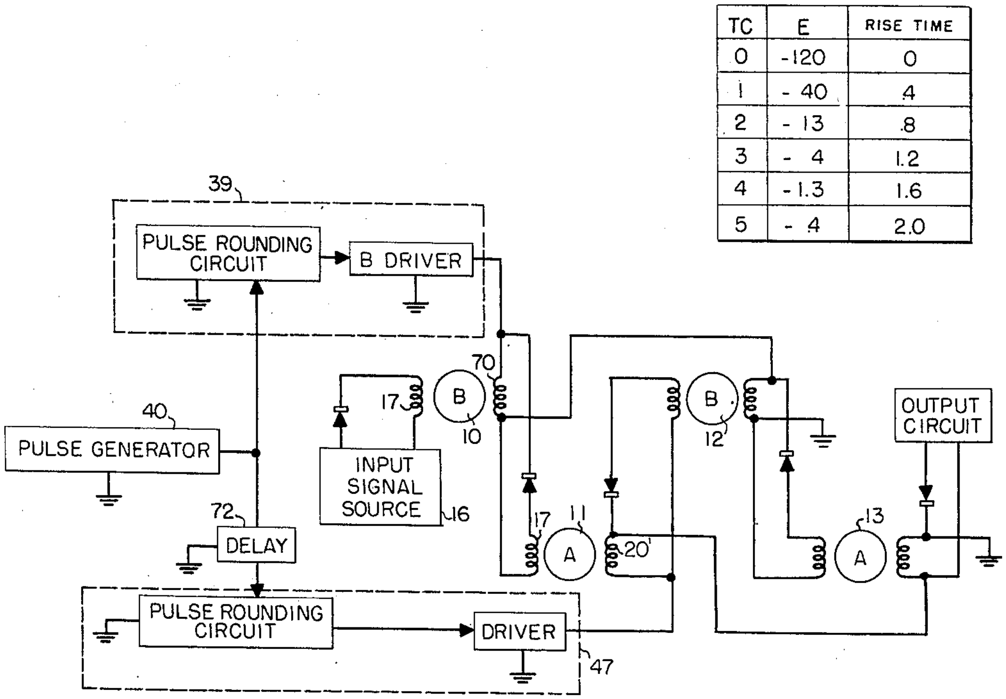
Fig. 4 is a circuit diagram of a further magnetic shift register embodiment of the invention.

The rounded waveform driver is heretofore specifically described in connection with a shift register of the conventional three winding type. However, the rounded waveform driving pulses similarly function to improve operation of other types of magnetic memory devices. A further specific example of such devices is schematically shown by the two winding shift registers of Fig. 4. In this type of shift register the cores 10, 11, 12, and 13, which are generally of toroidal configuration, have a single input winding 17 and a combined output shift winding 70 which serves the same function as the two separate windings of the corresponding three winding shift register in Fig. 1. In operation, information is passed along the shift register elements in the same general manner described in connection with the shift register of Fig. 1. The coupling circuit between two elements comprises a single series rectifier circuit which connects the shift winding of one element to the receiving winding of the next, and which prevents flow of the driving current through the receiving windings of the shift register elements in addition to its normal function of preventing transfer of read-in signal pulses between the respective elements. In this shift register circuit also, the improved operation is effected by the rounded driving pulse illustrated in the waveforms of Fig. 2B. To provide the proper alternate driving pulses to the respective A and B sub-register units, a delay circuit 72 may be inserted in the A driver circuit, when the pulse generator 40 does not inself provide the delayed pulses.

It is clear from the foregoing description of the invention and its operation that improved operation is afforded both in rounding the driving waveform pulses, and in providing means for operating magnetic memory elements with input pulses of variable duration. Accordingly, those features believed descriptive of the nature of the invention are defined with particularity in the appended claims.

What is claimed is:

1. Magnetic memory apparatus comprising first and second magnetic binary storage cores, means including a winding on said first core for storing a baud in said first core, and means including a generator of rounded shift current pulses and windings on said first and second cores for transferring the baud from the first to the second core.

2. Magnetic memory apparatus comprising first and second magnetic binary storage cores, means including a receiving winding on said first core for storing a baud therein, shift and transmitting windings on said first core, a receiving winding on said second core, connections including a rectifier connecting said transmitting winding to said receiving winding on said second core, and means for generating and supplying a rounded shift current pulse to said shift winding for causing said baud to be transferred to said second core.

3. The invention claimed in claim 2 in which the means for generating the rounded pulse comprises a rectangular wave generator, and a rounded wave generator connected to the rectangular wave generator.

4. In combination, with a magnetic memory device having a shift winding on a binary core, a shift current pulse generator comprising a rectangular wave generator, an electronic device having a control electrode, a cathode and an anode, means including a resistor connecting said control electrode to said generator, means including a bias voltage source for biasing said device below cutoff connecting said cathode to said square wave generator, a capacitor connecting said control electrode to said cathode, and connections for connecting said anode to said shift winding.

5. In combination with magnetic memory apparatus having binary storage cores with shift windings thereon, a generator of shift current pulses having rounded forward edges, connected to said shift windings.

6. The invention claimed in claim 5 in which the generator is connected to a rectangular wave generator.

7. In combination with magnetic memory apparatus having storage cores with shift windings thereon, an electronic device having an anode connected to said shift windings, and having a control electrode and a cathode, a rectangular wave generator, means including a resistor connecting said control electrode to said generator, means including a bias voltage source for biasing said device below cutoff, connecting said cathode to said generator, and a capacitor connecting said control electrode to said cathode.

8. In combination with a magnetic memory device including a magnetic binary core with a shift winding thereon, a generator of rounded shift current pulses connected to said winding.

9. In combination with a magnetic memory device including a magnetic binary core with a shift and a receiving winding thereon, a generator of rounded shift current pulses connected to said shift winding, and a signal current source connected to said receiving winding.

10. Magnetic memory apparatus comprising first and second magnetic binary storage cores, means including a receiving winding on said first core for storing a "one" therein, a shift winding on said first core, means for supplying a rounded wave shift current pulse to said shift winding, a transmitting winding on said first core, and a receiving winding on said second core connected to said transmitting winding.

11. In combination with a magnetic memory device including a magnetic binary core with a shift winding thereon an input circuit including a coupling capacitor, the input circuit having a predetermined time constant, means for supplying variable length input pulses to said input circuit some of which pulses are longer in duration than said time constant, asymmetrical means coupled to said capacitor for causing input potentials to be developed only in one polarity whereby a single resulting pulse of substantially fixed duration is provided for an input pulse of any length greater than the time constant, and pulse rounding means connected to said shaft winding for providing a rounded leading edge upon the resulting pulse applying the resulting pulse to said shift winding.

12. The combination defined in claim 11 including a pulse amplifier circuit connected to said shift winding for applying a shift pulse thereto, wherein said means for providing a rounded leading edge comprises a coupling circuit for conveying said resulting pulse to the amplifier circuit, said coupling circuit having distributed circuit capacity and associated resistance affording a time constant causing the leading edge of the resulting pulse to have a slow rise time.

13. In combination a driving circuit for magnetic memory devices, an input circuit including a coupling capacitor, the input circuit having a predetermined time constant, means for supplying variable length input pulses to said input circuit some of which pulses are longer in duration than said time constant, and asymmetrical means coupled to said capacitor for causing input potentials to be developed only in one polarity whereby a single resulting pulse of substantially fixed duration is provided for an input pulse of any length greater than the time constant said single resulting pulse being applied to said driving circuit.

14. The combination claimed in claim 8 including a rectangular wave generator connected to said generator of rounded shift current pulses in which said generator of rounded shift current pulses comprises an amplifying device having a cathode circuit connected for amplifying the shift pulses from said rectangular wave generator, and an inductor coupled in the cathode circuit of such value that the amplified shift pulses have rounded leading edges.

References Cited in the file of this patent

UNITED STATES PATENTS

| | | |
|---|---|---|
| 2,347,777 | Hanscom | May 2, 1944 |
| 2,652,501 | Wilson | Sept. 15, 1953 |
| 2,695,992 | Winger | Nov. 30, 1954 |
| 2,708,722 | An Wang | May 17, 1955 |